United States Patent [19]

von Kempski et al.

[11] 4,371,196
[45] Feb. 1, 1983

[54] SECURITY FILAMENT AS PROTECTION AGAINST FRAUD

[75] Inventors: Walter von Kempski, Leverkusen; Fritz Kirstein, Cologne, both of Fed. Rep. of Germany

[73] Assignee: Agfa-Gevaert Aktiengesellschaft, Leverkusen, Fed. Rep. of Germany

[21] Appl. No.: 248,471

[22] Filed: Mar. 27, 1981

[30] Foreign Application Priority Data

Apr. 3, 1980 [DE] Fed. Rep. of Germany ....... 3013238

[51] Int. Cl.³ .......................................... B42D 15/00
[52] U.S. Cl. .................................... 283/7; 283/8 R; 283/57; 428/916
[58] Field of Search .................. 283/7, 8 R, 9 R, 57, 283/58; 40/2.2; 235/487, 488; 428/916, 398

[56] References Cited

U.S. PATENT DOCUMENTS

| 3,533,176 | 10/1970 | Weitzberg et al. | 40/2.2 |
| 4,183,989 | 1/1980 | Tooth | 428/916 |
| 4,186,943 | 2/1980 | Lee | 283/9 R |
| 4,290,630 | 9/1981 | Lee | 283/8 R |

FOREIGN PATENT DOCUMENTS 1507288 4/1978 United Kingdom .
2015429 9/1979 United Kingdom .

Primary Examiner—Michael W. Ball
Attorney, Agent, or Firm—Connolly and Hutz

[57] ABSTRACT

The invention relates to a security filament to protect against forgery of bank notes, securities, permit cards, identity cards and passports, whereby the safety thread has a cross-sectional shape by which it can be identified optically and is provided with structural features on its surface which extend invariably over the length of the thread.

8 Claims, 6 Drawing Figures

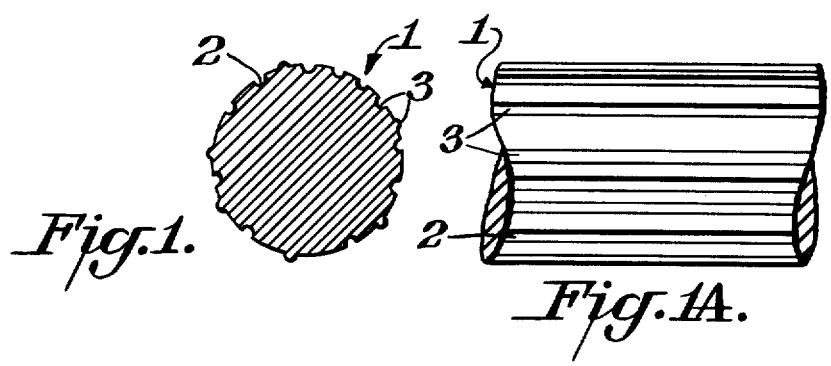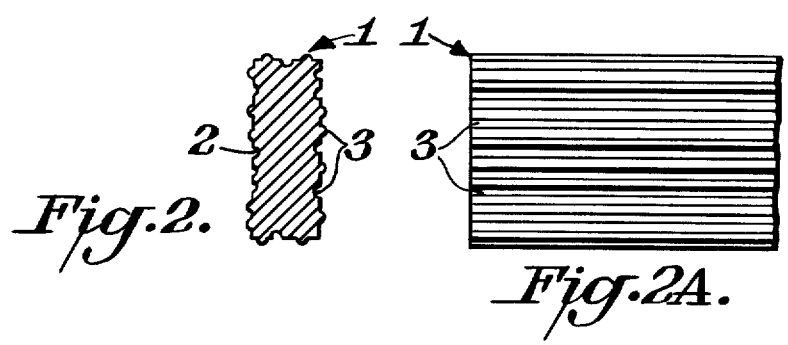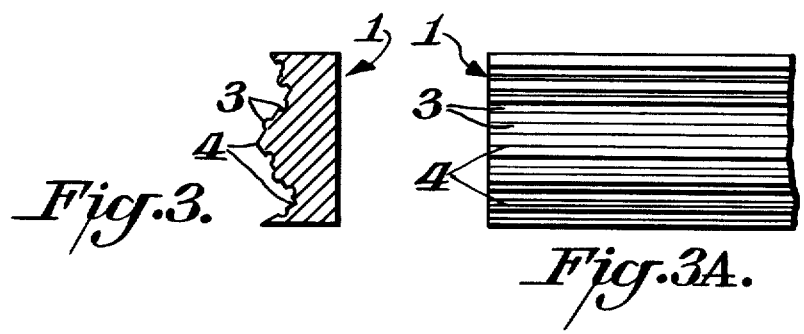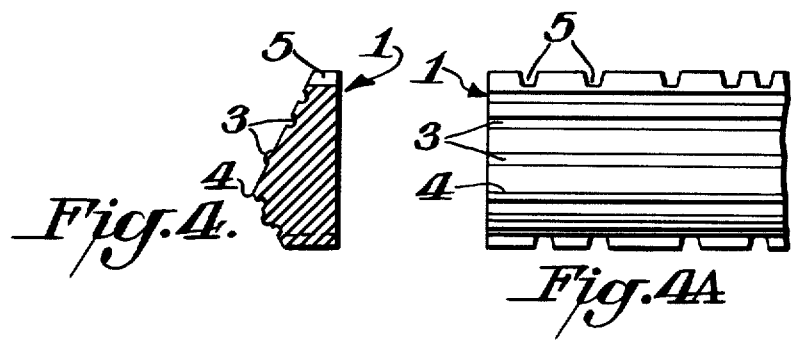

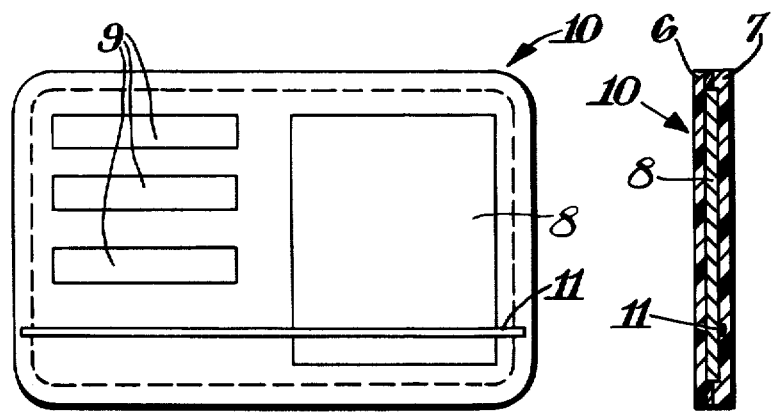
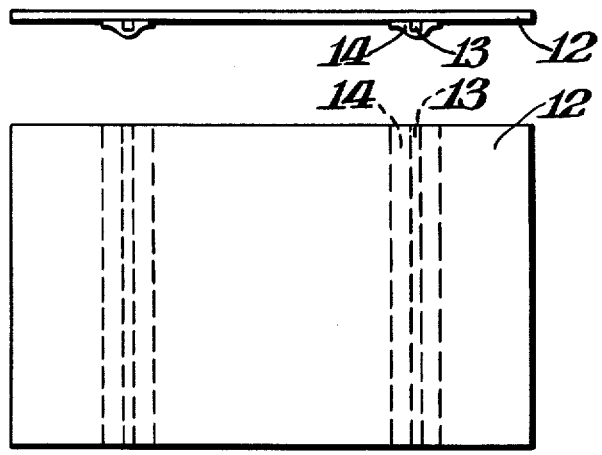
Fig. 5.  Fig. 5A.
Fig. 6A.
Fig. 6.

SECURITY FILAMENT AS PROTECTION AGAINST FRAUD

The present invention relates to a security filament for protection against forgery of bank notes, permit cards, securities, identification cards and passports, in which the security filament is applied to the documents or is introduced into the documents so that it may be examined without destroying the documents.

It is known to provide documents such as bank notes, securities, permit cards, identification cards (ID cards) or passports with a number of security measures the object of which is to make forgery of these documents impossible.

Security measures of this type include, for example, raster printing or parallel line printing on the document. Background lines are described, for example, in German Offenlegungsschrift No. 2,630,002.

Documents often have visible or perceptible watermarks in special papers. It is often difficult to reproduce the printing inks of the documents using photographic materials. It is known from British Pat. No. 2,015,429 to provide documents with such reproduction proof or forgery-proof coloured representations.

In general, it is known to provide documents, such as ID card-insets with passport photos, signatures or finger prints and to then weld the documents between films.

In order to prevent the exchange of passport photos which have been inserted, the insert may be produced from a piece of special coated photographic paper and the data and passport photo are exposed and developed on the coating. This insert may then also be provided with additional line or raster print and may be welded between films.

Swiss Pat. No. 4,077,066 describes an identification card which is provided with water-marks, radioactive or fluorescent marks and an intermediate layer to which is applied a photographic emulsion layer bearing a passport photo of the card owner. Also, a signature strip which is no longer accessible in the finished identification card and an embossing stamp applied onto the outer covering film are provided. An additional imprint on the card blank in the form of thin wave lines, as are used, for example, with bank notes, which may be made in different colours, extends the protection against forgeries.

Furthermore, it is known to apply photographic marks to the documents. Another conventional safety precaution is the preparation of one of the inside faces or the surface of the documents using dyes which are only visible at wavelengths in the ultraviolet or infrared range.

It is known from German Offenlegungsschrift No. 2,631,246 to provide documents such as identification cards, permit cards and the like with permanent magnets, magnetic sheets, magnetic tapes or metal sheets. These devices may be used to open a magnetic lock or to operate a switch. It is proposed according to U.S. Pat. No. 4,066,873 to insert magnetic strips which contain coded magnetic information from which an imprinted binary code is simultaneously provided to give optical information.

Finally, it is known from British Pat. No. 1,427,581 to use a paper similar to that used for bank notes, which, as a carrier of the specific security and authenticity features, is provided with visible and perceptive watermarks and a security filament and is printed on one or both sides with details of the securities or bank notes. In this method, the security filament is couched into the paper felt during the production of the paper.

This idea and a number of other known ideas for the manufacture of documents have the disadvantage that they do not offer any reliable protection against potential forgers and do not allow easy and unambiguous establishment of authenticity by people using simple methods. The combination of a number of security measures naturally makes the forgery of such documents difficult, but at the same time involves a considerable increase in the cost of the documents. At present, high security for a document requires components made of materials which are kept secret, which cannot be obtained on the open market and whose production and distribution are restricted. The documents have to be produced using non-standard techniques (special constructions) which are very expensive in the case of small quantities.

The object of the present invention is to provide a means by which documents can always be identified as genuine using simple means, which is cheap to produce and is extremely secure.

This object is achieved according to the invention by a security filament which is characterized in that it has a cross-section by which it can be identified and is provided with structural features on its surface which extend invariably over the length of the filament or are repeated in short spacings and are used as an identification feature for the security filament when examined optically.

The cross-section and the surface structure of the security filament are produced by drawing the thread through a calibrating device.

Surprisingly, it has been found that a safety thread of this type always retains the same cross-section even when it is very long and retains the structure impressed thereon by the drawing bore. In the same way as it is always possible to establish from revolver bullets whether they were fired from the same weapon, the filament, when magnified optically, may be compared with the photograph of an original security filament in a simple manner and it may be established reliably whether it is an original or a forgery.

The security filament may be produced from any material, for example, a metal wire or metal alloy wire, if these can be shaped in a calibrating device when cold or with the application of heat. Aluminium wires, wires of lead, tin and zinc alloys and copper wires are particularly suitable. Wires made of special alloys or of high-grade metals may also be used, but they are considerably more expensive to manufacture and do not provide any substantial additional advantages.

The security filament may also be produced from glass or synthetic materials when it is advantageous to colour the starting material so that the structural features produced by the calibrating tool are more clearly visible.

The production of the security filament and the material for the security filament are therefore very cheap. The application of a calibrated security filament to a document may also be carried out easily and cheaply. For example, calibrated security wires or filaments may be bonded onto bank notes and securities and may be protected from damage by a lacquer layer.

The application or bonding of safety threads onto documents is particularly advantageous, where the documents are encased or welded into films on one or both sides, such as, for example, in the case of permit cards, identification cards and passports.

These cards (ID cards) normally consists of a film to which the insert, consisting of, for example, photographic paper with a passport photo and personal information, signature etc, is applied in a permanent manner and of a covering film which is bonded to the lower film and the insert. The security filament is inserted between the insert and the covering films and is bonded together with these. In an enlargement, the cross-section and the structure of the security filament may easily be discerned through the covering film and may easily be compared and identified with an original or with an enlarged photo of an authentic filament.

The calibrated security filament is also surprisingly secure against fraud since the same and therefore a unique calibrating tool may be used for all security filaments in a particular application, for example for the identity cards of one country, it is easy to prevent misuse of the tool.

It would hardly be possible for a forger to copy a calibrating tool with all of its intended and unintended irregularities to produce identical security filaments. Detaching of the security filament in order to apply a genuine thread to another document may easily be prevented by making the security filament with very thin material of very brittle quality.

The security filaments may be manufactured from such materials and secured to the documents or in the cards so that an attempt to detach or remove the filament leads to its destruction.

While security filaments having flat, rectangular cross-sections are preferably used where the filament is to be bonded to a document, in order to obtain as large a bonding surface as possible, security filaments which are welded into films may have any possible cross-sections.

The cross-section of the security filament and its dimensions may be freely selected depending on the effect required. Very thin safety threads with, for example, a diameter of 20 μm produce a width of 2 mm, in an enlargement of 100 times at which width it is very difficult to identify details of the filament surface.

Therefore, for security filaments of this size, an enlargement of from 500 to 1000 times is required, which then shows a filament surface of 10 or 20 mm in width. If thicker security filaments of 200 μm or 1 mm are used, then with an enlargement of 100 times, characteristics of the surface structure which are adequate for assessment may be observed on a width of 20 mm or 100 mm and may be compared with the original structure.

For the volume and the visible surface, a band-shaped safety thread, for example with a thickness of from 0.02 to 0.05 mm and a width of from 1 to 2 mm is advantageous, because a large visible comparison surface is produced with small volume and low tearing resistance.

Further advantages and possibilities for use and embodiments may be seen from the following description, in connection with the accompanying drawings.

FIG. 1 illustrates an embodiment of the security filament having a circular cross-section, FIG. 2 illustrates an embodiment of the security filament having a rectangular cross-section, FIG. 3 illustrates an embodiment of the security filament having a modified rectangular cross-section, FIG. 4 illustrates an embodiment of the security filament having a modified rectangular cross-section after an additional lateral shaping, FIG. 5 illustrates a security filament in an identity card, and FIG. 6 illustrates two security filaments on one document.

FIG. 1 illustrates a safety thread 1 having a circular cross-section, in section (lefthand side) and in top view (righthand side). The thread 1 is drawn in a calibrating tool which has a circular cross-section. At least four inwardly-pointing edges are positioned in the tool, on the circumference of the circular cross-section at different spacings from each other. These edges are used to determine the top side of the round filament drawn by the tool. There are a number of drawing grooves and drawing edges in irregular spacings between the edges projecting inwards, which result from the production of the calibrating tool.

The worked edges of the tool produce deep channels 2 on the circumference of the thread 1 and the drawing grooves and drawing edges of the tool located between these worked edges produce smaller edges and grooves 3 on the thread 1.

In order to identify a security filament, the edges and grooves 3 produced on the thread 1 by the drawing grooves and drawing edges of the tool, between the relevant channels 2 produced by the tool are compared with respect to their shape and spacing from each other.

As the authenticity-checking procedure is based on a simple comparison of the shape and spacings of the drawing grooves and drawing edges on a security filament and an authentic security filament, it is also possible to impart a twist to the security filament when passing through the calibrating tool, so that the drawing grooves and drawing edges run round the security filament in a spiral and forgery, if at all possible, is made substantially more difficult.

FIG. 2 illustrates a security filament 1 having a rectangular cross-section, the ratio of width to height of which may be selected according to the intended use.

The surface of this embodiment of a security filament also shows the characteristic drawing grooves and drawing edges 3 which are produced when drawn through a calibrating tool.

In order to allow the lower and upper side to be identified, one of the wide sides is provided with a channel 2 which is produced by a worked edge in the calibrating tool. Two comparison patterns are required for the security filament when it is applied onto documents without a lateral orientation, one pattern with the channel 2 and one without the channel 2 and with the relevant drawing grooves and drawing edges.

FIG. 3 illustrates a rectangular security filament, whose surfaces were shaped irregularly when drawing and which thus shows, apart from the drawing grooves and drawing edges 3, the borders 2 in the longitudinal direction to the surface. A comparison of the enlargement of the original with the security filament to be tested is facilitated by the borders 2 because the surface is divided into sections.

The cross-sectional shape of the security filament is in no way restricted to the shapes in the FIGS. 1 to 3, but instead other cross-sectional shapes, such as, for example, a triangular shape or an oval cross-section or other combinations of cross-sectional shapes are also possible.

The security filament has a further particular characteristic because on leaving the calibrating tool, it is caught laterally by two knurling wheels working in opposite directions and is provided with regular or, as shown in FIG. 4, with irregular knurls 5. Apart from the characteristics 2 and 3 which have already been mentioned, the knurl 5 provides an additional identification feature for a security filament which, for example, when enlarged, may be easily compared with the enlarged photo of the original and may be identified as being authentic.

Furthermore, it is also possible, but not necessary, to provide the security filament with additional features. The filament may be manufactured from a specific metal or metal alloy. It may be radioactive, magnetic or fluorescent or may have a specific electrical resistance per unit of length. Various colours may be produced by anodizing the thread. Therefore, it is also possible to produce identification cards using a calibrating tool, the safety threads of which cards may be subjected to the same optical test, whereby however, a copper thread, for example, is used for men's identification cards and an aluminium thread for women's cards.

FIG. 5 illustrates an example of use for a calibrated safety thread, whereby the thread 1 is welded into an identification card (ID card) 10. ID cards may be identity cards to identify the owner thereof or prove him to be a member of a specific group, or may also be permit cards which allow the owner to claim specific services.

The ID card 10 comprises, for example, a film 6 as a backing layer, an insert 8 with a passport photo and personal data 9 of the owner and a covering film 7 made of transparent material. The insert 8 may consist of a photographic paper having a black and white or colour emulsion coating. By exposure, the data 9 of the owner and the passport photo may be exposed and developed. The insert 8 is provided with at least one security filament 11, positioned between the film 6 and the covering film 7 and the films are bonded on top of each other at the edges. Greater security against unauthorised alteration of the insert 8 is obtained, as is known, if the films 6 and 7 are joined permanently on both sides by bonding or welding with the total surface of the insert 8. In this manner, the security filament 11 is also joined permanently to the insert 8 and the covering film 7 and is embedded therein.

The ID card prepared in this manner therefore has an extremely high degree of security at minimum cost for material and production. Further security precautions of the type mentioned earlier on may of course be provided but are only required for specific purposes as, for example, for readability by machines or electromagnetic devices.

All shapes of security filaments which have been described, i.e. filaments with round, oval, rectangular or other cross-sections are suitable for the ID cards.

To check authenticity of the ID card, the card is, for example, introduced into an enlarger similar to a microscope, with an enlargement of from 50 to 500 times, and the surface structure of the security filament to be tested is compared with a photographic enlargement of an original security filament produced on the same scale. Checks of this type may be carried out by stationary checking stations (frontier stations) or by mobile checking stations (for example mobile patrols) and do not require specially trained staff or particularly expensive devices, for greatest reliability of the authenticity check.

Comparison microscopes which are also suitable for the comparison and identification of the security filaments are known from criminal technology. Another very exact check of the security filament is also possible by observing the security filament under test with a microscope in which the grooves and channels of the original filament are reflected for comparison and are superimposed.

Likewise, electronic scanners may be used at stationary checking stations in order to check the security filament.

FIG. 6 illustrates the use of the security filament to render secure documents or passports 12. In the production of the documents 12, one or more security filaments 13 are bonded to the document using an adhesive so that they are joined permanently to the document and any attempt to detach the filament 13 leads to the destruction of the filament. After the bonding step, the surface of the security filament 13 is coated with a layer of clear lacquer. The authenticity check is then carried out through the lacquer layer as described.

Thin metal strips, which have a relatively wide checking surface with a small thickness are preferably used for security filaments to be applied by bonding. As a result of this, the volume and the tearing strength are considerably reduced, so that it is difficult to detach the security filament without damaging the filament or the document.

The security filament which has been described is an extremely reliable means of protecting documents, such as bank notes, deeds, passports and identification cards in the most simple manner against forgery. The production of the security filaments and their application to documents or ID cards may be carried out in a simple and cheap manner. The authenticity check of comparing an original filament with a security filament on a document may easily be effected optically by anyone using a low-price enlarger or a microscope without the risk of forgers obtaining means which could facilitate forgery.

We claim:

1. In combination,
    a thread having longitudinal grooved and raised portion surface formations,
    formed into the circumference of the longitudinal thread
    and providing a visibly identifiable cross-section in said thread,
    said surface formations extending longitudinally of said thread along a substantial part of its length,
    and a card carrying said thread in a visible position.

2. The combination of claim 1 characterised in that the thread is produced from a metal or a metal alloy.

3. The combination of claim 1 characterised in that the thread is made of glass or plastics.

4. The combination as claimed in claim 1, wherein the thread is bonded to said card.

5. The combination as claimed in claim 4, having a covering film covering the thread, said thread being visible through the film.

6. The combination of claim 5 characterised in that at least one thread is bonded permanently to a document and is protected by a lacquer layer.

7. The combination as claimed in claim 1, wherein the surface formations are produced by drawing the thread through a calibrating device.

8. The combination as claimed in claim 1, wherein additional radial surface formations are longitudinally spaced apart on said thread.

* * * * *